(12) United States Patent
Sumitomo

(10) Patent No.: US 12,294,300 B2
(45) Date of Patent: May 6, 2025

(54) SWITCH CONTROL CIRCUIT, VOLTAGE OUTPUT DEVICE, AND VEHICLE

(71) Applicant: ROHM CO., LTD., Kyoto (JP)

(72) Inventor: Hironori Sumitomo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 227 days.

(21) Appl. No.: 18/078,365

(22) Filed: Dec. 9, 2022

(65) Prior Publication Data

US 2023/0198401 A1 Jun. 22, 2023

(30) Foreign Application Priority Data

Dec. 17, 2021 (JP) ................................ 2021-204765

(51) Int. Cl.
*H02M 3/158* (2006.01)
*H02M 1/00* (2006.01)
*H02M 1/088* (2006.01)

(52) U.S. Cl.
CPC ......... *H02M 3/158* (2013.01); *H02M 1/0009* (2021.05); *H02M 1/088* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155;
(Continued)

(56) References Cited

U.S. PATENT DOCUMENTS

| 7,501,805 | B2 * | 3/2009 | Chen | H02M 3/156 |
| | | | | 323/901 |
| 8,797,012 | B1 * | 8/2014 | Chui | H02M 3/1563 |
| | | | | 323/284 |

(Continued)

FOREIGN PATENT DOCUMENTS

JP 2017-60383 3/2017

*Primary Examiner* — Jeffrey A Gblende
(74) *Attorney, Agent, or Firm* — Fish & Richardson P.C.

(57) ABSTRACT

A switch control circuit configured to control a first switch having a first terminal to which a first voltage is applied, and a second switch having a first terminal connected to a second terminal of the first switch and a second terminal to which a second voltage lower than the first voltage is applied. The switch control circuit includes: a first sampling/holding circuit configured to sample and hold a switch voltage generated at a connection node between the first switch and the second switch when the second switch is turned off; a first comparison circuit configured to compare the switch voltage sampled and held by the first sampling/holding circuit with a first constant voltage; and a first dead time adjustor configured to adjust a dead time when the switch voltage rises according to an output of the first comparison circuit.

8 Claims, 11 Drawing Sheets

(58) Field of Classification Search
CPC ...... H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | |
|---|---|---|---|
| 9,906,131 B1* | 2/2018 | Lee | H02M 1/38 |
| 10,116,211 B2* | 10/2018 | Chen | H02M 3/158 |
| 2019/0319536 A1* | 10/2019 | Hashiguchi | G01R 19/0092 |

* cited by examiner

US 12,294,300 B2

SWITCH CONTROL CIRCUIT, VOLTAGE OUTPUT DEVICE, AND VEHICLE

CROSS-REFERENCE TO RELATED APPLICATION

This application is based upon and claims the benefit of priority from Japanese Patent Application No. 2021-204765, filed on Dec. 17, 2021, the entire contents of which are incorporated herein by reference.

TECHNICAL FIELD

The present disclosure relates to a switch control circuit, a voltage output device provided with the switch control circuit, and a vehicle provided with the voltage output device.

BACKGROUND

When a first switch and a second switch, which are connected in series with each other, are simultaneously turned on under control of a switch control circuit, a through current may flow to damage the first switch and the second switch.

In order to prevent the first switch and the second switch from being turned on simultaneously, the switch control circuit provides a dead time during which both the first switch and the second switch are turned off.

The dead time is one of the causes that reduce efficiency in the voltage output device, which is provided with the first switch, the second switch, and the switch control circuit. Therefore, it is desired that the dead time be as short as possible. However, in a design in which the dead time is too short, a through current may flow due to variations in characteristics of the first switch, the second switch, and the switch control circuit. In other words, there is a problem that it is difficult to adjust the dead time.

SUMMARY

Some embodiments of the present disclosure provide a switch control circuit configured to control a first switch having a first terminal to which a first voltage is applied, and a second switch having a first terminal connected to a second terminal of the first switch and a second terminal to which a second voltage lower than the first voltage is applied. The switch control circuit includes: a first sampling/holding circuit configured to sample and hold a switch voltage generated at a connection node between the first switch and the second switch when the second switch is turned off; a first comparison circuit configured to compare the switch voltage sampled and held by the first sampling/holding circuit with a first constant voltage; and a first dead time adjustor configured to adjust a dead time when the switch voltage rises according to an output of the first comparison circuit.

A voltage output device includes the switch control circuit configured as described above, the first switch, and the second switch.

A vehicle includes the voltage output device configured as described above.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

In this specification, the term "constant voltage" refers to a voltage that is constant in an ideal state, and refers to a voltage that may fluctuate slightly due to a change in temperature or the like in reality.

In this specification, the term "reference voltage" refers to a voltage that is constant in an ideal state, and refers to a voltage that may fluctuate slightly due to a change in temperature or the like in reality.

In this specification, the term "MOSFET (metal-oxide-semiconductor field-effect transistor)" refers to a field effect transistor having a gate structure consisting of at least three layers of a "layer made of a conductor or a semiconductor such as polysilicon having a low resistance value," an "insulating layer," and a "P-type, N-type, or intrinsic semiconductor layer." That is, the gate structure of the MOSFET is not limited to a three-layer structure of a metal, an oxide, and a semiconductor.

<Switching Power Supply Device>

Figure 1:
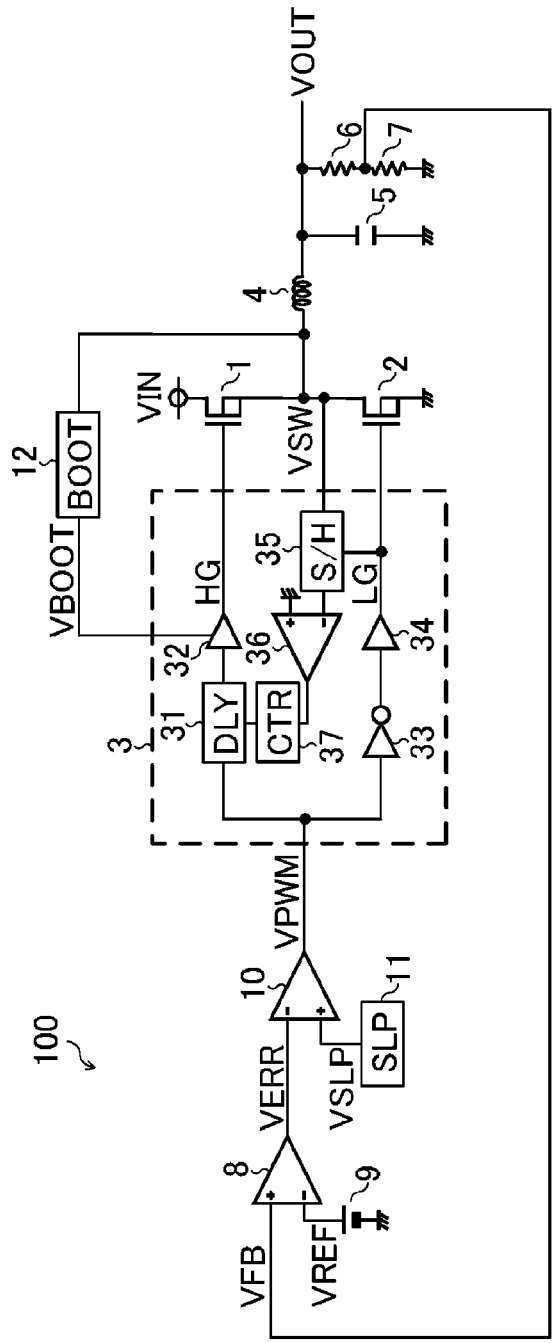
FIG. 1 is a view showing a configuration example of a switching power supply device according to an embodiment.

FIG. 1 is a diagram showing a configuration example of a switching power supply device according to an embodiment. A switching power supply device 100 shown in FIG. 1 includes N-channel MOSFETs 1 and 2, a switch control circuit 3, an inductor 4, an output capacitor 5, resistors 6 and 7, an error amplifier 8, a reference voltage source 9, a comparator 10, a slope circuit 11, and a bootstrap circuit 12. The switching power supply device 100 steps down an input voltage VIN, thereby generating an output voltage VOUT and outputting the output voltage VOUT.

The N-channel MOSFETs 1 and 2 are connected in series with each other. The input voltage VIN is applied to a drain of the N-channel MOSFET 1. A source of N-channel MOSFET 1 is connected to a drain of N-channel MOSFET 2, a first end of the inductor 4, an input terminal of the bootstrap circuit 12, and an input terminal of a sampling/holding circuit 35 in the switch control circuit 3. A source of the N-channel MOSFET 2 is connected to the ground potential.

The first end of the inductor 4 is connected to a first end of the output capacitor 5 and a first end of the resistor 6. A second end of the output capacitor 5 is connected to the ground potential. The first end of the resistor 6 is connected to a first end of the resistor 7 and a non-inverting input terminal of the error amplifier 8. A second end of the resistor 7 is connected to the ground potential.

An inverting input terminal of the error amplifier 8 is connected to a positive terminal of the reference voltage source 9. A negative terminal of the reference voltage source 9 is connected to the ground potential.

An output terminal of the error amplifier 8 is connected to an inverting input terminal of the comparator 10. A non-inverting input terminal of the comparator 10 is connected to an output terminal of the slope circuit 11.

An output terminal of the comparator 10, an output terminal of the bootstrap circuit 12, and gates of the N-channel MOSFETs 1 and 2 are connected to the switch control circuit 3.

The N-channel MOSFETs 1 and 2 are complementarily turned on and off under control of the switch control circuit 3. As a result, a pulse-like switch voltage VSW is generated at a connection node between the N-channel MOSFET 1 and the N-channel MOSFET 2.

The inductor 4 and the output capacitor 5 smooth the pulse-like switch voltage VSW to generate the output voltage VOUT.

The resistors 6 and 7 divide the output voltage VOUT to generate a feedback voltage VFB.

The error amplifier 8 generates an error signal VERR corresponding to a difference between the feedback voltage VFB and the reference voltage VREF output from the reference voltage source 9.

The comparator 10 generates a PWM (pulse width modulation) voltage VPWM, which is a result of comparing the error signal VERR and a slope voltage VSLP output from the slope circuit 11. The slope voltage VSLP is a sawtooth waveform voltage with a fixed period.

The bootstrap circuit 12 generates a boot voltage VBOOT, which is higher than the input voltage VIN, from the switch voltage VSW. The boot voltage VBOOT is used as a drive voltage for a driver 32 in the switch control circuit 3.

The switch control circuit 3 generates gate signals HG and LG based on the PWM voltage VPWM. The switch control circuit 3 supplies the gate signal HG to the gate of the N-channel MOSFET 1 and supplies the gate signal LG to the gate of the N-channel MOSFET 2.

The switch control circuit 3 includes a delay circuit 31, the driver 32, an inverter 33, a driver 34, the sampling/holding circuit 35, a comparison/clock generation circuit 36, and a counter 37.

The delay circuit 31 delays the PWM voltage VPWM before supplying it to the driver 32. The delay circuit 31 changes a delay time according to a count value of the counter 37.

The driver 32 amplifies the output of the delay circuit 31 to generate the gate signal HG, and supplies the gate signal HG to the gate of the N-channel MOSFET 1.

The inverter 33 supplies an inverted signal of the PWM voltage VPWM to the driver 34.

The driver 34 amplifies the output of the inverter 33 to generate the gate signal LG and supplies the gate signal LG to the gate of the N-channel MOSFET 2.

The sampling/holding circuit 35 samples the switch voltage VSW when the N-channel MOSFET 2 is turned off, and holds the sampled switch voltage VSW.

The comparison/clock generation circuit 36 compares the switch voltage VSW sampled and held by the sampling/holding circuit 35 with the ground potential, and generates a clock signal according to the comparison result.

The counter 37 performs a counting operation according to the clock signal generated by the comparison/clock generation circuit 36. That is, the counter 37 performs the counting operation according to the comparison result of the comparison/clock generation circuit 36.

The delay circuit 31, the clock generator in the comparison/clock generation circuit 36, and the counter 37 described above are an example of a first dead time adjustor that adjusts a dead time when the switch voltage VSW rises according to a comparison result between the switch voltage VSW sampled and held by the sampling/holding circuit 35 and a first constant voltage. In the configuration example shown in FIG. 1, the first constant voltage is the ground potential, but the first constant voltage may be a value other than the ground potential. When the first constant voltage is the ground potential, it is easy to set the first constant voltage.

The first dead time adjustor continues to adjust the dead time when the switch voltage VSW rises until the switch voltage VSW sampled and held by the sampling/holding circuit 35 becomes the first constant voltage. As a result, the dead time when the switch voltage VSW rises is automatically adjusted so that the switch voltage VSW sampled and held by the sampling/holding circuit 35 becomes the first constant voltage.

Figure 2:
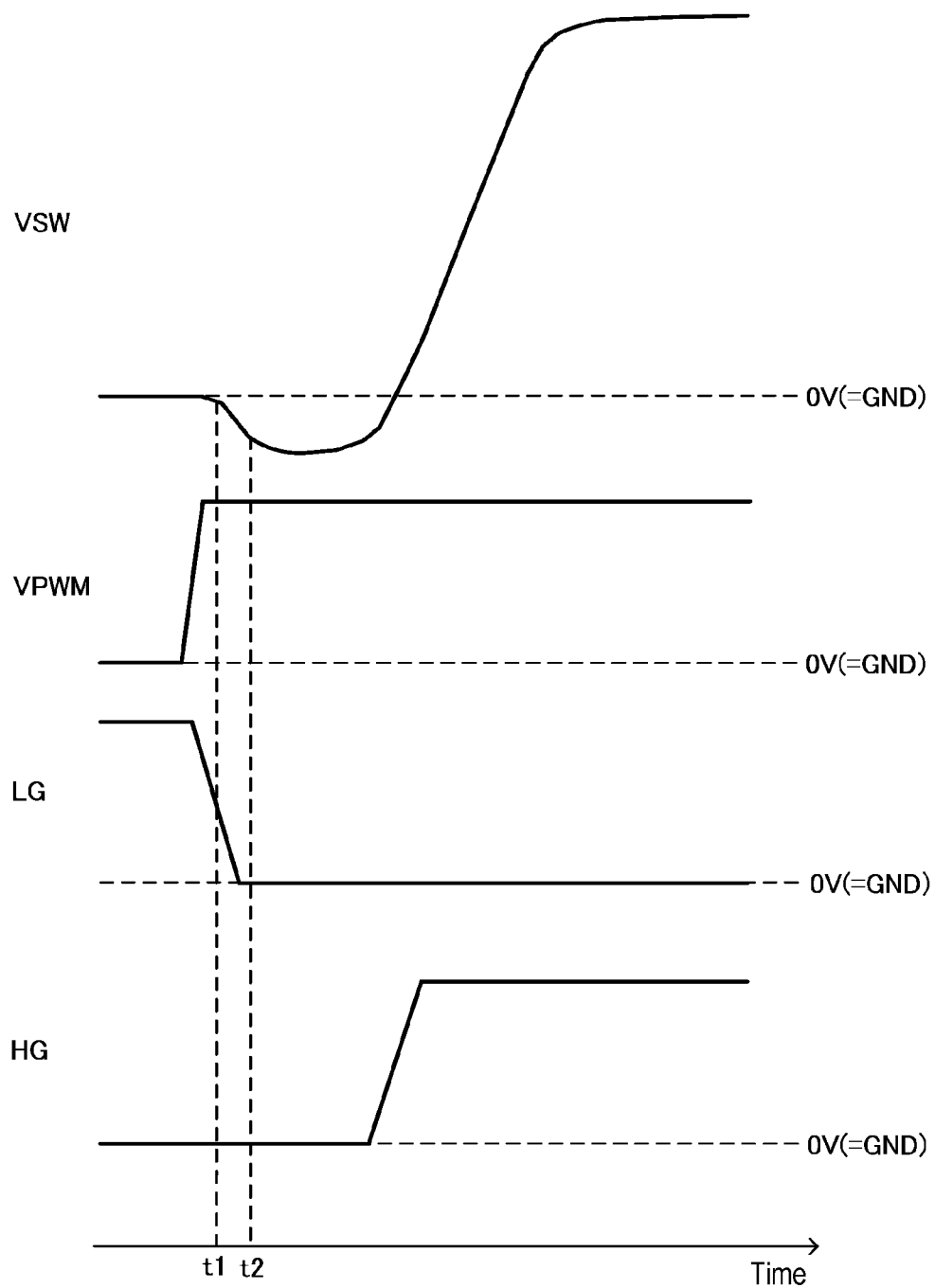
FIG. 2 is a diagram showing an example of waveforms of voltages in respective components of the switching power supply device shown in FIG. 1.

FIG. 2 is a diagram showing an example of waveforms of voltages in respective components of the switching power supply device shown in FIG. 1. More specifically, FIG. 2 is a diagram showing an example of waveforms of voltages in respective components when the switch voltage VSW sampled and held by the sampling/holding circuit 35 is not the first constant voltage.

Figure 3:
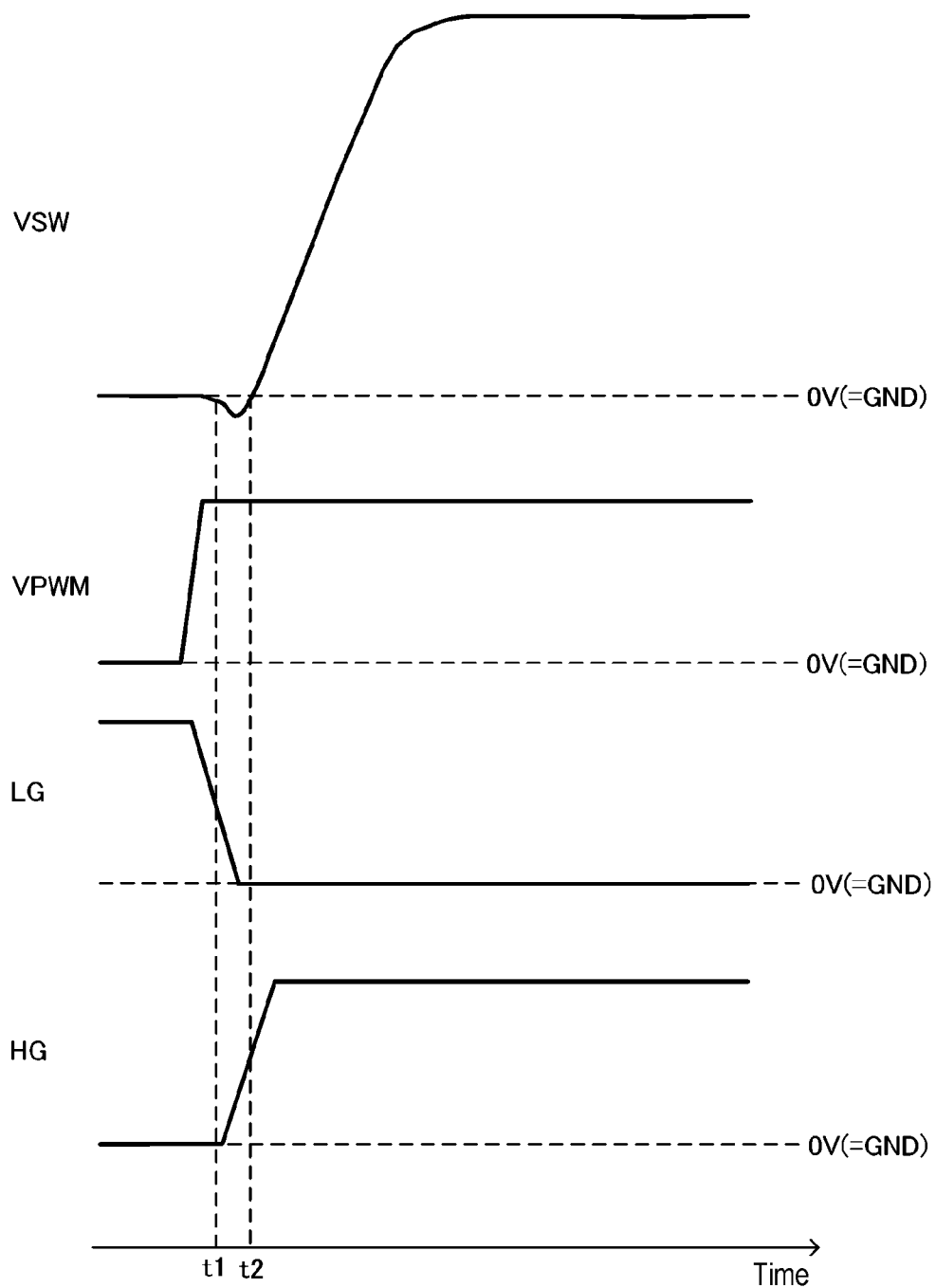
FIG. 3 is a diagram showing another example of waveforms of voltages in respective components of the switching power supply device shown in FIG. 1.

FIG. 3 is a diagram showing another example of waveforms of voltages in respective components of the switching power supply device shown in FIG. 1. More specifically, FIG. 3 is a diagram showing an example of waveforms of voltages in respective components when the switch voltage VSW sampled and held by the sampling/holding circuit 35 is the first constant voltage.

The voltages in the respective parts shown in FIGS. 2 and 3 are the switch voltage VSW, the PWM voltage VPWM, the gate signal HG (a gate voltage of the N-channel MOSFET 1), and the gate signal LG (a gate voltage of the N-channel MOSFET 2).

Timing t1 shown in FIGS. 2 and 3 is a reference timing for sampling by the sampling/holding circuit 35, and is a timing at which a level of the gate signal LG transitions. In the example shown in FIGS. 2 and 3, timing t1 is a time at which the level of the gate signal LG reaches a middle point between a HIGH level and a LOW level (=GND) of the gate signal LG. However, timing t1 is not limited to the time at which the level of the gate signal LG reaches the middle point between the HIGH level and the LOW level (=GND) of the gate signal LG. For example, timing t1 may be a time at which the level of the gate signal LG becomes 20% of the HIGH level of the gate signal LG. As timing t1 is set closer to a final stage of the level transition of the gate signal LG, the dead time can be set more reliably even when an ambient temperature or the like of the switching power supply device 100 shown in FIG. 1 is changed.

Timing t2 shown in FIGS. 2 and 3 is a timing at which the sampling/holding circuit 35 samples the switch voltage VSW. In the examples shown in FIGS. 2 and 3, timing t2 is a time after a certain period of time has passed from timing t1. However, timing t2 is not limited to the time after a certain period of time has passed from timing t1. That is, timing t2 may coincide with timing t1.

As is apparent from the comparison between FIGS. 2 and 3, the dead time when the switch voltage VSW rises is shortened by automatically adjusting the dead time when the switch voltage VSW rises as described above.

The switch control circuit 3 changes the gate signal HG to a signal that is not delayed with respect to the PWM voltage VPWM after the rise of the switch voltage VSW is completed, and changes the gate signal HG to a signal that is delayed by the delay time set by the delay circuit 31 with respect to the PWM voltage VPWM after a fall of the switch voltage VSW is completed.

<Delay Circuit, Sampling/Holding Circuit, Comparison/Clock Generation Circuit, and Counter>

Figure 4:
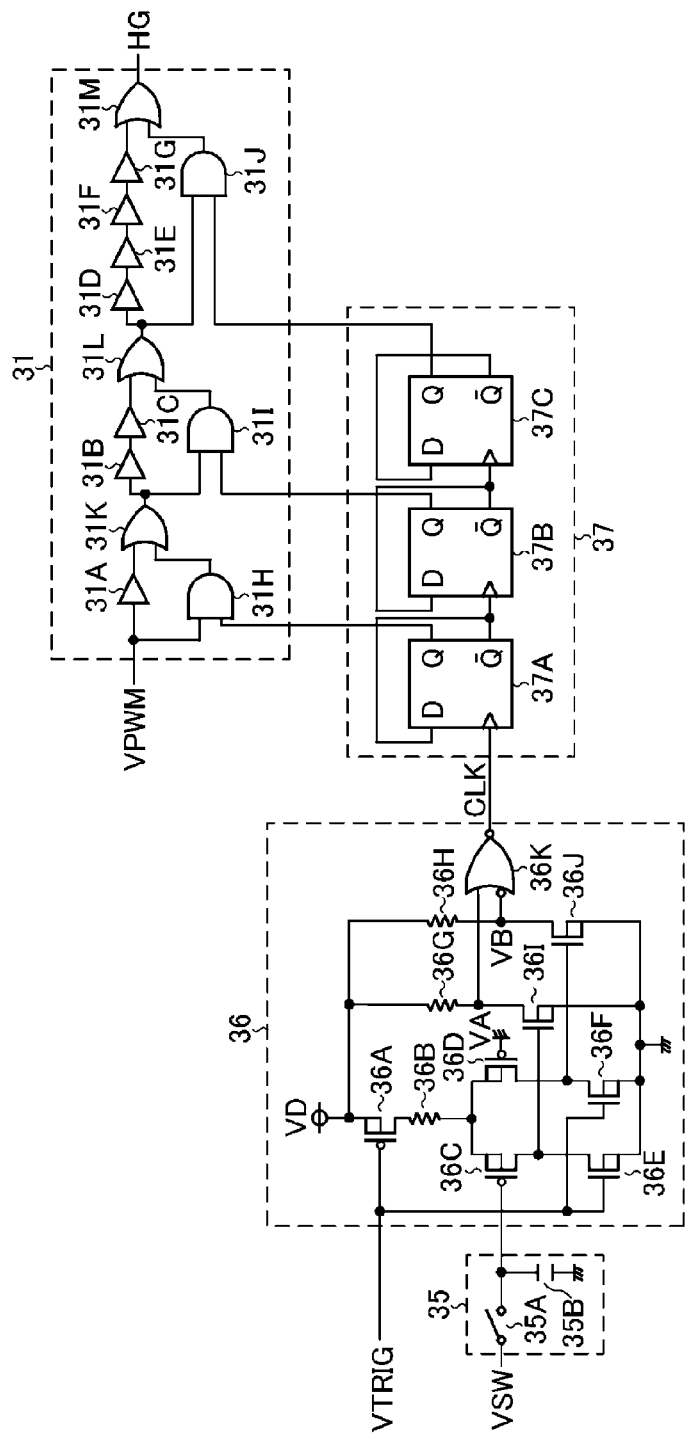
FIG. 4 is a diagram showing a configuration example of a delay circuit, a sampling/holding circuit, a comparison/clock generation circuit, and a counter.

FIG. 4 is a diagram showing a configuration example of the delay circuit 31, the sampling/holding circuit 35, the comparison/clock generation circuit 36, and the counter 37.

The delay circuit 31 of the configuration example shown in FIG. 4 includes delayers 31A to 31G, AND gates 31H to 31J, and OR gates 31K to 31M.

The PWM voltage VPWM is supplied to an input terminal of the delayer 31A and a first input terminal of the AND gate 31H. A first output of the counter 37 is supplied to a second input terminal of the AND gate 31H. An output of the delayer 31A is supplied to a first input terminal of the OR gate 31K, and an output of the AND gate 31H is supplied to a second input terminal of the OR gate 31K.

An output of the OR gate 31K is supplied to an input terminal of the delayer 31B and a first input terminal of the AND gate 31I. A second output of the counter 37 is supplied to a second input terminal of the AND gate 31I. An output of the delayer 31B is supplied to an input terminal of the delayer 31C. An output of the delayer 31C is supplied to a first input terminal of the OR gate 31L, and an output of the AND gate 31I is supplied to a second input terminal of the OR gate 31L.

An output of the OR gate 31L is supplied to an input terminal of the delayer 31D and a first input terminal of the AND gate 31J. A third output of the counter 37 is supplied to a second input terminal of the AND gate 31J. An output of the delayer 31D is supplied to an input terminal of the delayer 31E. An output of the delayer 31E is supplied to an input terminal of the delayer 31F. An output of the delayer 31F is supplied to an input terminal of the delayer 31G. An output of the delayer 31G is supplied to a first input terminal of the OR gate 31M, and an output of the AND gate 31J is supplied to a second input terminal of the OR gate 31M. The OR gate 31M outputs the gate signal HG.

For example, when each of the first to third outputs of the counter 37 is "0," the delay time set by the delay circuit 31 is a sum of the delay times set by the delayers 31A to 31G.

Further, for example, when each of the first to third outputs of the counter 37 is "1," the delay time set by the delay circuit 31 is zero.

The sampling/holding circuit 35 of the configuration example shown in FIG. 4 includes a switch 35A and a capacitor 35B. The switch 35A is turned on at timing t2 described above. The capacitor 35B holds the switch voltage VSW at timing t2 described above.

The comparison/clock generation circuit 36 of configuration example shown in FIG. 4 includes a P-channel MOSFET 36A, a resistor 36B, P-channel MOSFETs 36C and 36D, N-channel MOSFETs 36E and 36F, resistors 36G and 36H, N-channel MOSFETs 36I and 36J, and an OR gate 36K.

A trigger voltage VTRIG is supplied to each of gates of the P-channel MOSFET 36A, the N-channel MOSFET 36E, and the N-channel MOSFET 36F. An output of the sampling/holding circuit 35 is supplied to a gate of the P-channel MOSFET 36C, and the ground potential is supplied to a gate of the P-channel MOSFET 36D.

A drive voltage VD is supplied to a source of the P-channel MOSFET 36A, a first terminal of the resistor 36G, and a first terminal of the resistor 36H. A drain of the P-channel MOSFET 36A is connected to sources of the P-channel MOSFETs 36C and 36D via the resistor 36B.

A drain of the P-channel MOSFET 36C is connected to a drain of the N-channel MOSFET 36E and a gate of the N-channel MOSFET 36I. A drain of the P-channel MOSFET 36D is connected to a drain of the N-channel MOSFET 36F and a gate of the N-channel MOSFET 36J.

Sources of the N-channel MOSFETs 36E, 36F, 36I, and 36J are connected to the ground potential.

A second terminal of the resistor 36G and a drain of the N-channel MOSFET 36I are connected to a first input terminal of the OR gate 36K. An inverted voltage of the voltage generated at a connection node between a second terminal of the resistor 36H and a drain of the N-channel MOSFET 36J is supplied to a second input terminal of the OR gate 36K. An inverted voltage of a voltage generated at an output terminal of the OR gate 36K becomes a clock signal CLK.

The trigger voltage VTRIG is a pulse voltage with a period corresponding to a sampling period of the sampling/holding circuit 35. When the trigger voltage VTRIG is at a LOW level, the comparison/clock generation circuit 36 of the configuration example shown in FIG. 4 compares the switch voltage VSW sampled and held by the sampling/holding circuit 35 with the ground potential.

Figure 5:
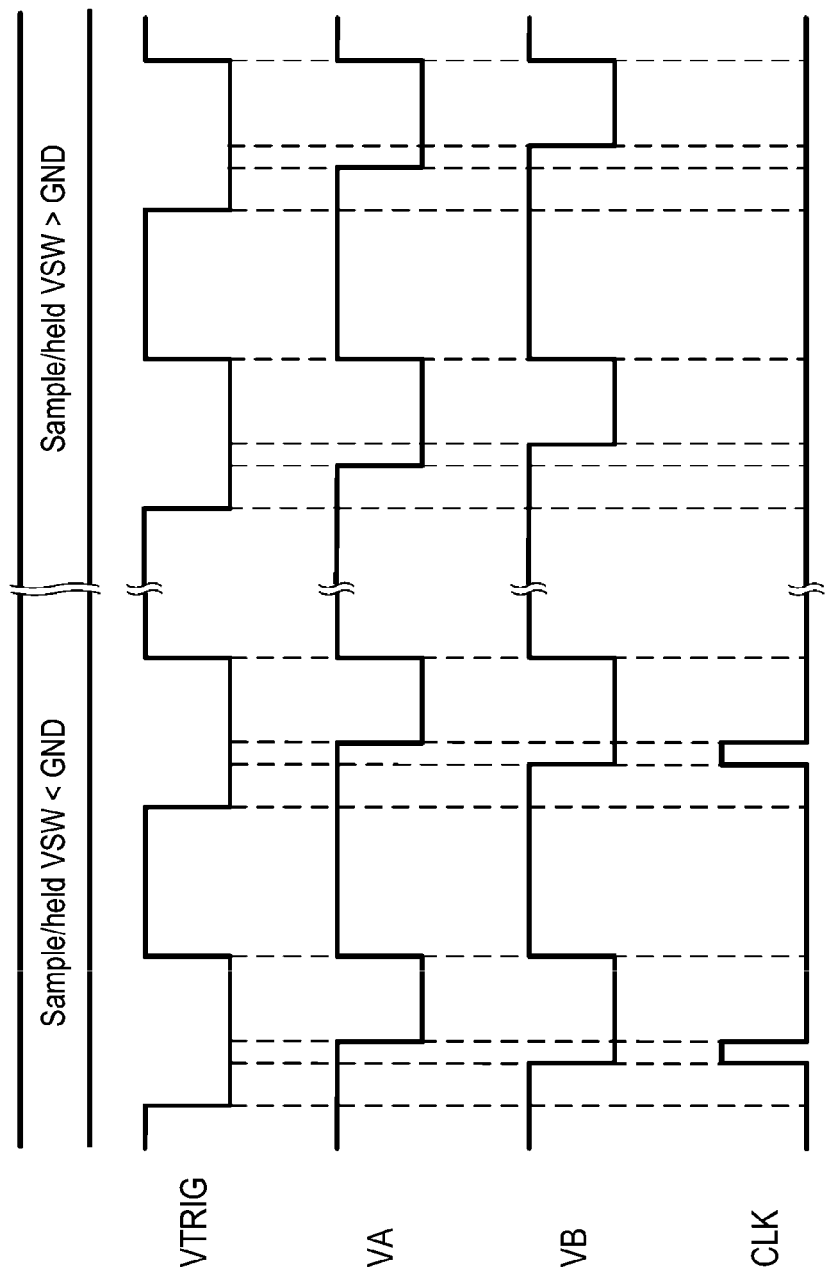
FIG. 5 is a diagram showing an example of waveforms of voltages in respective components of the comparison/clock generation circuit.

When the switch voltage VSW sampled and held by the sampling/holding circuit 35 is lower than the ground potential, a voltage VB falls faster than a voltage VA. Therefore, a pulse is generated in the clock signal CLK (see FIG. 5). The voltage VA is a voltage generated at a connection node between the resistor 36G and the N-channel MOSFET 36I, and the voltage VB is a voltage generated at a connection node between the resistor 36H and the N-channel MOSFET 36J.

On the other hand, when the switch voltage VSW sampled and held by the sampling/holding circuit 35 is higher than the ground potential, the voltage VA falls faster than a voltage VB. Therefore, no pulse is generated in the clock signal CLK (see FIG. 5).

According to the configuration example shown in FIG. 4, the delay time set by the delay circuit 31 is digitally varied according to the count value of the counter 37. This increases a noise resistance of the first dead time adjustor.

Figure 6:
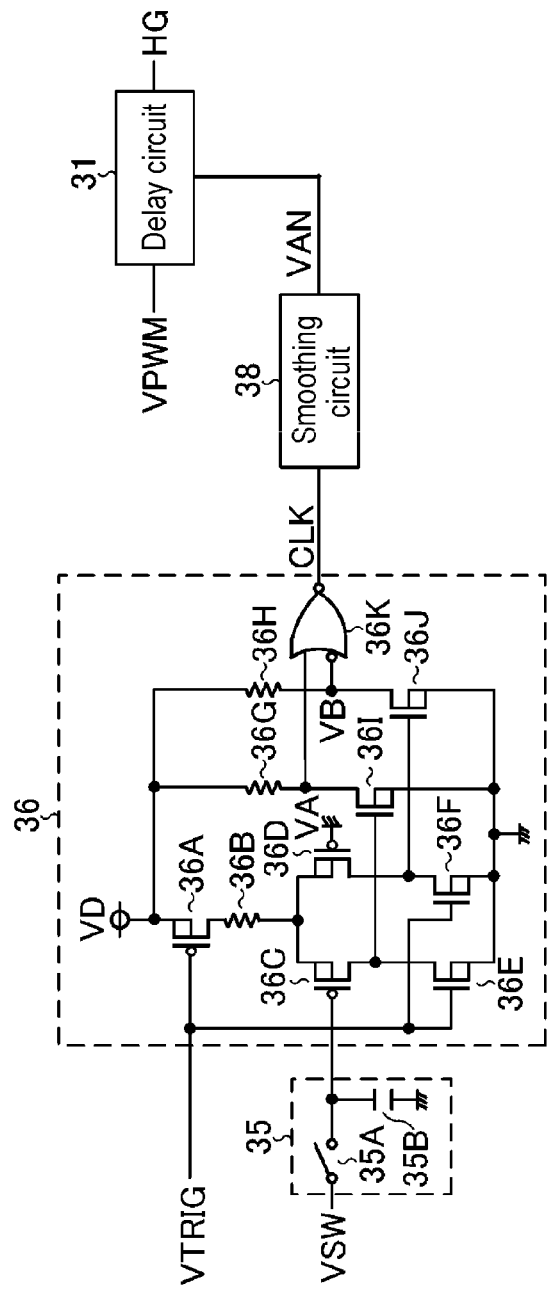
FIG. 6 is a diagram showing another configuration example of a first dead time adjustor.

As shown in FIG. 6, instead of the counter 37, a smoothing circuit 38 for smoothing the clock signal CLK to generate an analog voltage VAN may be provided so that the delay circuit 31 changes the delay time according to the analog voltage VAN output from the smoothing circuit 38. According to the configuration example shown in FIG. 6, it is possible to reduce a circuit scale of the first dead time adjustor.

Further, the counter 37 is an up-counter that can count up but cannot count down. Therefore, the dead time when the switch voltage VSW rises is variable only in one direction (decreasing direction).

Figure 7:
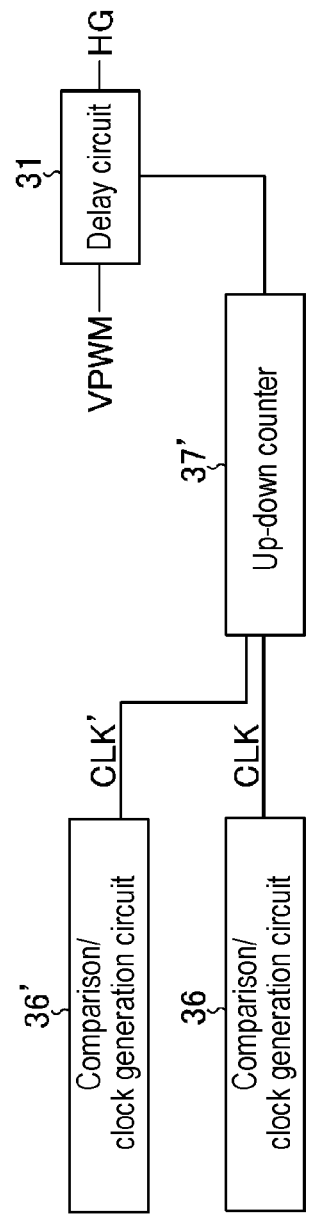
FIG. 7 is a diagram showing yet another configuration example of the first dead time adjustor.

For example, by changing the configuration example shown in FIG. 4 to the configuration example shown in FIG. 7, the dead time when the switch voltage VSW rises can be bidirectionally varied.

The comparison/clock generation circuit 36 of the configuration example shown in FIG. 7 compares the switch voltage VSW sampled and held by the sampling/holding circuit 35 with the ground potential, and generates the clock signal CLK according to the comparison result.

A comparison/clock generation circuit 36' of the configuration example shown in FIG. 7 compares the switch voltage VSW sampled and held by the sampling/holding circuit 35 with an upper limit voltage higher than the ground potential, and generates a clock signal CLK' according to the comparison result.

An up-down counter 37' of the configuration example shown in FIG. 7 performs an up-counting operation when the clock signal CLK is supplied, and performs a down-counting operation when the clock signal CLK' is supplied.

The delay circuit 31 of the configuration example shown in FIG. 7 changes the delay time according to a count value of the up-down counter 37'. As the count value of the up-down counter 37' increases, the delay time set by the delay circuit 31 of the configuration example shown in FIG. 7 decreases.

Figure 8:
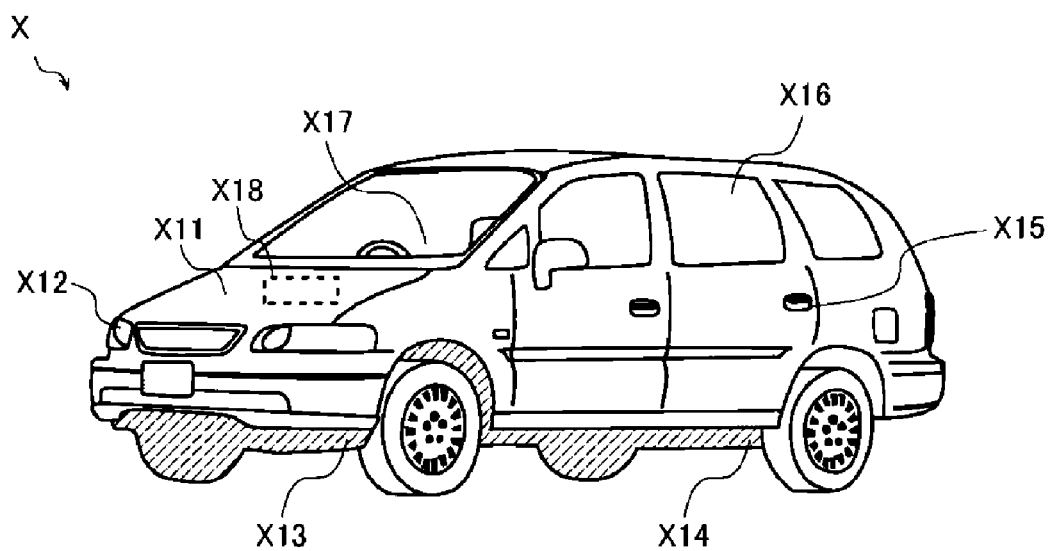
FIG. 8 is an external perspective view of a vehicle.

FIG. 8 is an external view of a vehicle X. The vehicle X of this configuration example is equipped with various electronic devices X11 to X18 that operate by receiving a voltage supplied from a battery (not shown). For the sake of convenience of illustration, mounting positions of the electronic devices X11 to X18 in the drawing may differ from actual ones.

The electronic device X11 is an engine control unit that performs engine-related controls (an injection control, an electronic throttle control, an idling control, an oxygen sensor control, a heater control, an auto-cruise control, etc.).

The electronic device X12 is a lamp control unit that controls lighting and extinguishing of an HID (high intensity discharged lamp) and a DRL (daytime running lamp).

The electronic device X13 is a transmission control unit that performs controls related to a transmission.

The electronic device X14 is a braking unit that performs controls related to a motion of the vehicle X (an ABS (anti-lock brake system) control, an EPS (electric power steering) control, an electronic suspension control, etc.).

The electronic device X15 is a security control unit that performs drive controls of a door lock, a security alarm, and the like.

The electronic device X16 is an electronic device built into the vehicle X at a factory shipment stage as standard equipment or manufacturer option, such as a wiper, an electric door mirror, a power window, a damper (shock absorber), an electric sunroof, an electric seat, or the like.

The electronic device X17 is an electronic device arbitrarily mounted on the vehicle X as a user option, such as an in-vehicle A/V (audio/visual) device, a car navigation system, and an ETC (electronic toll collection system).

The electronic device X18 is an electronic device provided with a high withstand voltage motor, such as an in-vehicle blower, an oil pump, a water pump, a battery cooling fan, or the like.

The switching power supply device 100 described above may be incorporated in any of the electronic devices X11 to X18.

The above-described embodiment is exemplary in all respects and not limitative. The technical scope of the present disclosure described herein is defined by the claims and not by the above description of the embodiment. It should be understood that all modifications within the meaning and scope of equivalents of the claims are included in the technical scope of the present disclosure.

For example, the switch control circuit 3 may be provided in a voltage output device other than the switching power supply device. Examples of the voltage output device other than the switching power supply device include a motor driver, an inverter, and the like.

Figure 9:
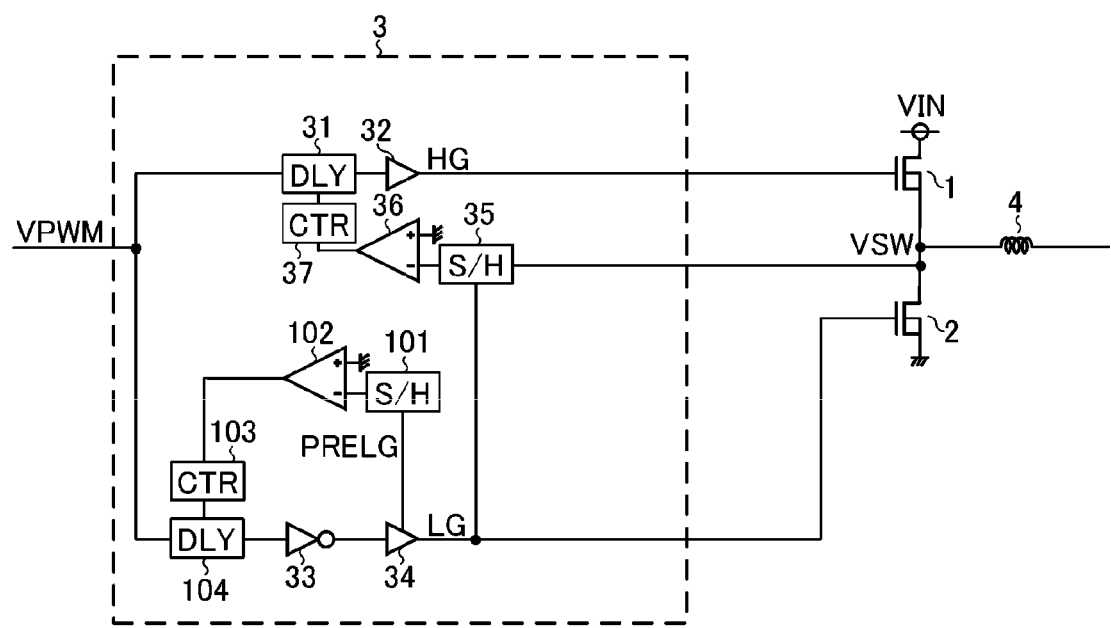
FIG. 9 is a diagram showing a modification of a switch control circuit.

Further, for example, the switch control circuit 3 may have a configuration shown in FIG. 9. The switch control circuit 3 having the configuration shown in FIG. 9 includes a sampling/holding circuit 101 and a second dead time adjustor.

The sampling/holding circuit 101 samples and holds the switch voltage VSW immediately before the N-channel MOSFET 2 is turned on.

The second dead time adjustor compares the switch voltage VSW sampled and held by the sampling/holding circuit 101 with a second constant voltage, and adjusts a dead time when the switch voltage VSW falls according to the comparison result.

The second dead time adjustor is configured by a clock generator in a comparison/clock generation circuit 102, a counter 103, and a delay circuit 104.

The comparison/clock generation circuit 102 compares the switch voltage VSW sampled and held by the sampling/holding circuit 101 with the ground potential, and generates a clock signal according to the comparison result. Further, in the configuration example shown in FIG. 9, the second constant voltage is the ground potential. However, the second constant voltage may be a value other than the ground potential.

The counter 103 performs a counting operation according to the clock signal generated by the comparison/clock generation circuit 102. In other words, the counter 103 performs a counting operation according to the comparison result of the comparison/clock generation circuit 102.

The delay circuit 104 delays the PWM voltage VPWM before supplying it to the inverter 33. The delay circuit 104 changes the delay time according to a count value of the counter 103.

The second dead time adjustor continues to adjust the dead time when the switch voltage VSW falls until the switch voltage VSW sampled and held by the sampling/holding circuit 101 becomes the second constant voltage. As a result, the dead time when the switch voltage VSW falls is automatically adjusted so that the switch voltage VSW sampled and held by the sampling/holding circuit 101 becomes the second constant voltage.

Figure 10:
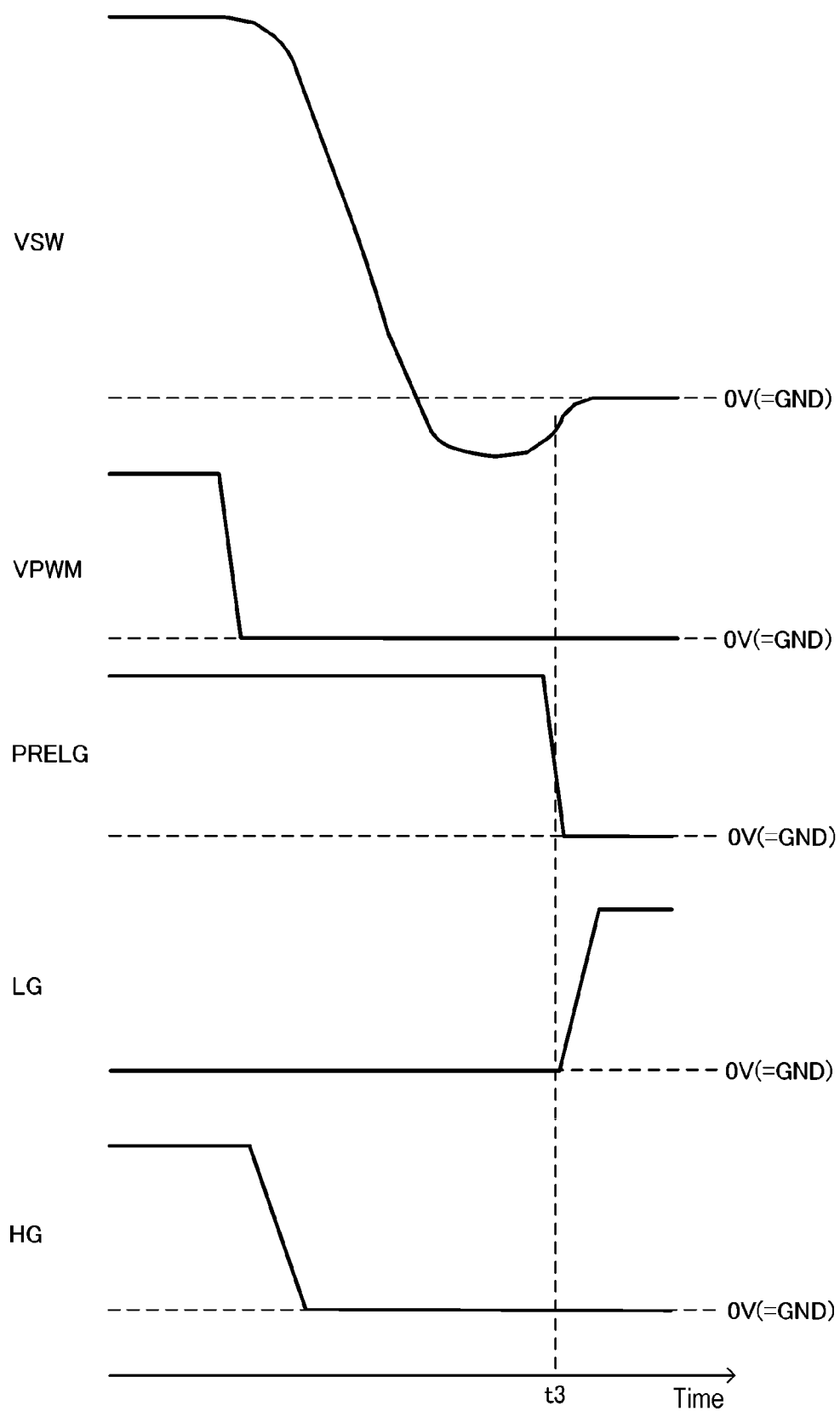
FIG. 10 is a diagram showing an example of waveforms of voltages in respective components of a switching power supply device including the switch control circuit of the configuration example shown in FIG. 9.

FIG. 10 is a diagram showing an example of waveforms of voltages in respective components of the switching power supply device provided with the switch control circuit 3 of the configuration example shown in FIG. 9.

The voltages of the respective components shown in FIG. 10 are the switch voltage VSW, the PWM voltage VPWM, the gate signal HG (gate voltage of the N-channel MOSFET 1), the gate signal LG (gate voltage of the N-channel MOSFET 2), and a pre-gate signal PRELG.

Timing t3 shown in FIG. 10 is a timing at which sampling is performed by the sampling/holding circuit 35, and is a timing at which a level of the pre-gate signal PRELG transitions. In the example shown in FIG. 10, timing t3 is a time at which the level of the pre-gate signal PRELG reaches a middle point between a HIGH level and a LOW level (=GND) of the pre-gate signal PRELG. However, timing t3 is not limited to the time at which the level of the pre-gate signal PRELG reaches the middle point between the HIGH level and the LOW level (=GND) of the gate signal LG. For example, timing t3 may be a time at which the level of the pre-gate signal PRELG becomes 70% of the HIGH level of the pre-gate signal PRELG. As timing t3 is set closer to a beginning of the level transition of the pre-gate signal PRELG, the dead time can be set more reliably even when the ambient temperature or the like of the switching power supply device is changed.

The switch control circuit 3 of the configuration example shown in FIG. 9 changes the gate signal LG to a signal that is not delayed with respect to the PWM voltage VPWM after the fall of the switch voltage VSW is completed, and changes the gate signal LG to a signal that is delayed by the delay time set by the delay circuit 104 with respect to the PWM voltage VPWM after the rise of the switch voltage VSW is completed.

Figure 11:
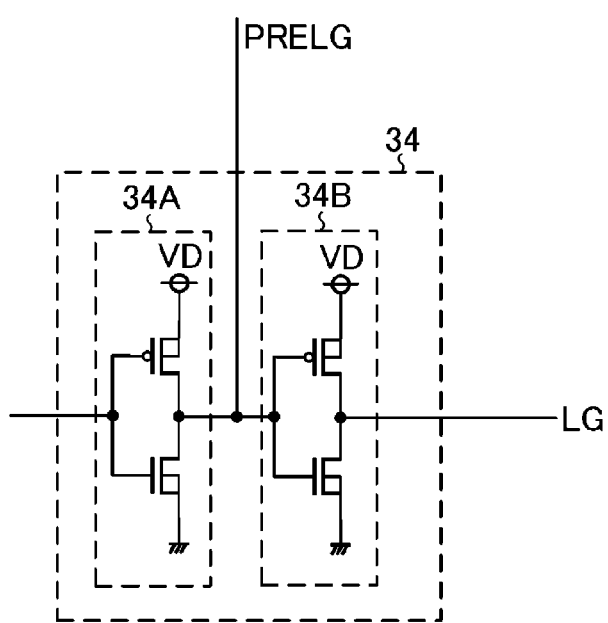
FIG. 11 is a diagram showing a configuration example of a driver.

The pre-gate signal PRELG described above is generated inside the driver 34. For example, when the driver 34 has a configuration shown in FIG. 11, the pre-gate signal PRELG is generated at a connection node between an output terminal of the inverter 34A in the driver 34 and an input terminal of the inverter 34B in the driver 34.

The switch control circuit (3) described above is configured to control a first switch (1) having a first terminal to which a first voltage is applied, and a second switch (2) having a first terminal connected to a second terminal of the first switch and a second terminal to which a second voltage lower than the first voltage is applied, the switch control circuit (3) including: a first sampling/holding circuit (35) configured to sample and hold a switch voltage generated at a connection node between the first switch and the second switch when the second switch is turned off; a first comparison circuit (36) configured to compare the switch voltage sampled and held by the first sampling/holding circuit with a first constant voltage; and a first dead time adjustor (31, 36, and 37) configured to adjust a dead time when the switch voltage rises according to an output of the first comparison circuit (first configuration).

In the switch control circuit of the first configuration, the dead time when the switch voltage rises is automatically adjusted so that the switch voltage sampled and held by the first sampling/holding circuit becomes the first constant voltage. Therefore, it is possible to shorten the dead time when the switch voltage rises.

In the switch control circuit of the first configuration, the first dead time adjustor may include a counter (37) configured to perform a counting operation according to the output of the first comparison circuit, and a delay circuit (31) configured to change a delay time according to a count value of the counter (second configuration).

In the switch control circuit of the second configuration, the delay time set by the delay circuit is digitally changed according to the count value of the counter. This increases a noise resistance of the first dead time adjustor.

In the switch control circuit of the second configuration, the counter may be an up-down counter (37') (third configuration).

The switch control circuit of the third configuration can bidirectionally change the dead time when the switch voltage rises.

In the switch control circuit of the first configuration, the first dead time adjustor may include a smoothing circuit (38) configured to smooth the output of the first comparison circuit, and a delay circuit (31) configured to change a delay time according to an output of the smoothing circuit (fourth configuration).

The switch control circuit of the fourth configuration can reduce a circuit scale of the first dead time adjustor.

In the switch control circuit of any one of the first to fourth configurations, the first constant voltage may be a ground potential (fifth configuration).

The switch control circuit of the fifth configuration allows easy setting of the first constant voltage.

The switch control circuit of any one of the first to fifth configurations further includes: a second sampling/holding circuit (101) configured to sample and hold the switch voltage immediately before the second switch is turned on; a second comparison circuit (102) configured to compare the switch voltage sampled and held by the second sampling/holding circuit with a second constant voltage; and a second dead time adjustor (102, 103, and 104) configured to adjust a dead time when the switch voltage falls according to an output of the second comparison circuit (sixth configuration).

In the switch control circuit of the sixth configuration, the dead time when the switch voltage falls is automatically adjusted so that the switch voltage sampled and held by the second sampling/holding circuit becomes the second constant voltage. Therefore, it is possible to shorten the dead time when the switch voltage falls.

The voltage output device (100) described above includes: the switch control circuit of any one of the first to sixth configurations; the first switch; and the second switch (seventh configuration).

The voltage output device of the seventh configuration can shorten the dead time when the switch voltage rises.

The vehicle (X) described above includes the voltage output device of the seventh configuration (eighth configuration).

The vehicle of the eighth configuration can shorten the dead time when the switch voltage rises.

According to the present disclosure in some embodiments, it is possible to shorten the dead time.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A switch control circuit configured to control a first switch having a first terminal to which a first voltage is applied, and a second switch having a first terminal connected to a second terminal of the first switch and a second terminal to which a second voltage lower than the first voltage is applied, the switch control circuit comprising:
- a first sampling/holding circuit configured to sample and hold a switch voltage generated at a connection node between the first switch and the second switch when the second switch is turned off;
- a first comparison circuit configured to compare the switch voltage sampled and held by the first sampling/holding circuit with a first constant voltage; and
- a first dead time adjustor configured to adjust a dead time when the switch voltage rises according to an output of the first comparison circuit,
- wherein the first dead time adjustor includes a counter configured to perform a counting operation according to the output of the first comparison circuit.

2. The switch control circuit of claim 1, wherein the first dead time adjustor further includes a delay circuit configured to change a delay time according to a count value of the counter.

3. The switch control circuit of claim 2, wherein the counter is an up-down counter.

4. The switch control circuit of claim 1, wherein the first dead time adjustor includes a smoothing circuit configured to smooth the output of the first comparison circuit, and a delay circuit configured to change a delay time according to an output of the smoothing circuit.

5. The switch control circuit of claim 1, wherein the first constant voltage is a ground potential.

6. The switch control circuit of claim 1, further comprising:
- a second sampling/holding circuit configured to sample and hold the switch voltage immediately before the second switch is turned on;
- a second comparison circuit configured to compare the switch voltage sampled and held by the second sampling/holding circuit with a second constant voltage; and
- a second dead time adjustor configured to adjust a dead time when the switch voltage falls according to an output of the second comparison circuit.

7. A voltage output device comprising:
the switch control circuit of claim 1;
the first switch; and
the second switch.

8. A vehicle comprising the voltage output device of claim 7.

* * * * *